United States Patent
Matsuno

(10) Patent No.: US 10,483,807 B2
(45) Date of Patent: Nov. 19, 2019

(54) NON-CONTACT POWER SUPPLY DEVICE AND NON-CONTACT POWER SUPPLY METHOD

(71) Applicant: TOSHIBA TEC KABUSHIKI KAISHA, Tokyo (JP)

(72) Inventor: Hirokazu Matsuno, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 15/839,166

(22) Filed: Dec. 12, 2017

(65) Prior Publication Data

US 2018/0183268 A1    Jun. 28, 2018

(30) Foreign Application Priority Data

Dec. 22, 2016  (JP) .................. 2016-248998

(51) Int. Cl.
| | |
|---|---|
| *H02J 50/12* | (2016.01) |
| *H02J 50/40* | (2016.01) |
| *H02J 50/80* | (2016.01) |
| *H04B 5/00* | (2006.01) |

(52) U.S. Cl.
CPC .............. *H02J 50/12* (2016.02); *H02J 50/40* (2016.02); *H02J 50/80* (2016.02); *H04B 5/0037* (2013.01); *H04B 5/0075* (2013.01)

(58) Field of Classification Search
CPC . H02J 50/12; H02J 50/80; H02J 50/40; H04B 5/0037; H04B 5/0075
See application file for complete search history.

(56) References Cited

U.S. PATENT DOCUMENTS

| | | |
|---|---|---|
| 2004/0218406 A1 | 11/2004 | Jang et al. |
| 2013/0038277 A1 | 2/2013 | Chan et al. |
| 2014/0015330 A1 | 1/2014 | Byun et al. |
| 2016/0214488 A1 | 7/2016 | Okamoto |

FOREIGN PATENT DOCUMENTS

| | | |
|---|---|---|
| JP | 2016-073099 | 5/2016 |

OTHER PUBLICATIONS

Extended European Search Report dated Mar. 16, 2018 in corresponding European Patent Application No. 17210064.6, 8 pages.

*Primary Examiner* — Robert L Deberadinis
(74) *Attorney, Agent, or Firm* — Kim & Stewart LLP

(57) ABSTRACT

According to one embodiment, a non-contact power supply device includes an inverter circuit configured to convert power supplied from a direct current (DC) power supply into alternating current (AC) power, a resonant circuit configured to supply the AC power to an external power receiving device in a non-contact manner, a current sensor electrically connected the inverter circuit, a voltage subtractor circuit configured to detect a voltage difference between a predetermined reference voltage and a voltage value of the AC power as detected by a voltage sensor in the external power receiving device, a current subtractor circuit configured to detect a current difference between a predetermined reference current and a current value of the AC power as detected by the current sensor, and a controller configured to control the inverter circuit to reduce the voltage difference and the current difference when the voltage is outside a predetermined range.

20 Claims, 4 Drawing Sheets

NON-CONTACT POWER SUPPLY DEVICE AND NON-CONTACT POWER SUPPLY METHOD

CROSS-REFERENCE TO RELATED APPLICATION

This application is based upon and claims the benefit of priority from Japanese Patent Application No. 2016-248998, filed Dec. 22, 2016, the entire contents of which are incorporated herein by reference.

FIELD

Embodiments described herein relate generally to a non-contact power supply device and a non-contact power supply method.

BACKGROUND

In the related art, information is transmitted between an electronic device and a peripheral device via a cable such as a universal serial bus (USB) cable. In addition, in recent years, devices are often connected in a cable-less manner by employing wireless transmission technologies. So as to maintain the portability provided by the cable-less technologies, there are also devices that transmit power wirelessly.

For example, in a cellular phone or the like, a technology capable of performing power transmission in a non-contact, wireless manner has been put to practical use. In such a technology, a power supply circuit and a power receiving circuit compatible with a non-contact power supply method such as an electromagnetic induction method or a magnetic field resonance method are used. By installing such a power supply circuit and a power receiving circuit in a power supply side device and a power receiving side device, respectively, it is possible to realize a non-contact power supply system that performs power transmission from the power supply side device to the power receiving side device in a cable-less manner. When an electric load of the power receiving side device will be large, a plurality of power receiving circuits can be connected in series with the electric load and power is supplied to each power receiving circuit from a plurality of power supply circuits provided in the power supply side device. In such a configuration, there is a possibility that an unbalance in the operating load between the power supply circuits (or the power receiving circuits) occurs. When the unbalance of the operating load occurs, there is a possibility that the charging/power supply operation becomes unstable, thus it is desired to eliminate the unbalance.

In the related art, to supply electric power to an electric load requiring a large current, there is a power conversion system in which a plurality of the power conversion devices are connected in series to a common voltage source and power is supplied from the plurality of the power conversion devices to the electric power load. In addition, to solve the unbalance of the operation load generated in each power conversion device, a technology has been proposed in which the output power of the power conversion device is set based on the deviation between an output voltage of the power conversion device and a target voltage and the output voltage is reduced when an input voltage of the power conversion device falls below a reference value set based on the power supply voltage.

However, the above-described related art is not for a non-contact power supply system, and it may be difficult to implement it in a non-contact power supply system. In addition, in the above-described technology in the related art, since the reference value varies according to the power supply voltage, there is a possibility that the configuration necessary to provide operational control becomes complicated.

DETAILED DESCRIPTION

Hereinafter, a non-contact power supply device and a non-contact power supply method according to an embodiment will be described with reference to drawings.

Figure 1:
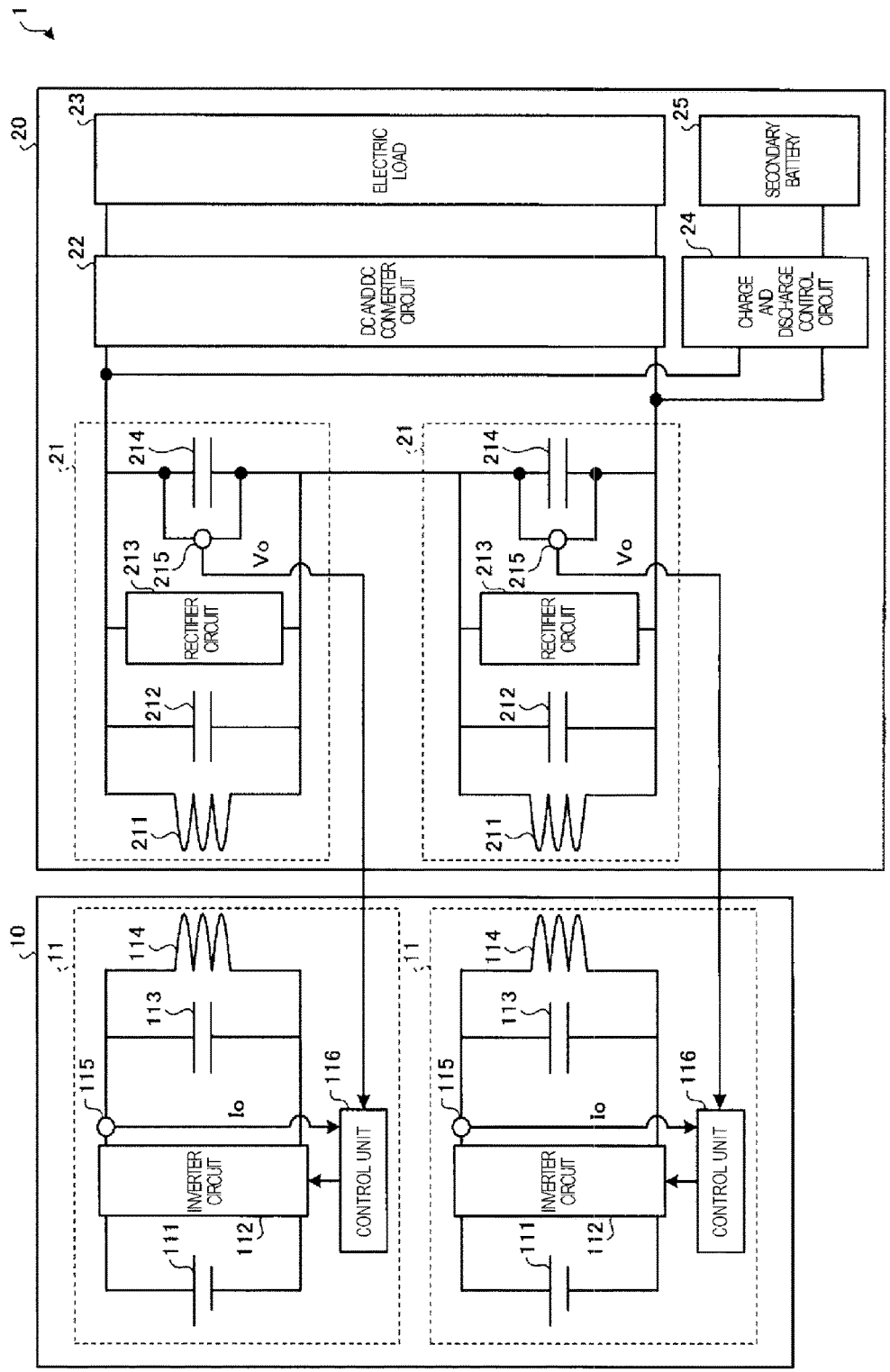
FIG. 1 is a schematic diagram of a non-contact power supply system according to an embodiment.

FIG. 1 is a schematic diagram of a non-contact power supply system according to an embodiment. As shown in FIG. 1, a non-contact power supply system 1 includes a power supply side device 10 of a non-contact power supply and a power receiving side device 20. The power supply side device 10 includes a plurality of power supply units 11.

Each power supply unit 11 includes a DC power supply 111, an inverter circuit 112, a capacitor 113, a primary side coil 114, a current sensor 115, a control unit 116, and the like.

The DC power supply 111 is, for example, a commercial power supply, a secondary battery, or the like, and supplies DC power to the power supply unit 11. In the configuration of FIG. 1 the power supply units 11 each include a DC power supply 111 individually, but the present disclosure is not limited thereto, and the power supply units 11 may be configured to use/share a common DC power supply 111.

The inverter circuit 112 is connected to the DC power supply 111. In addition, the capacitor 113 and the primary side coil 114 are connected in parallel to the inverter circuit 112.

The inverter circuit 112 is, for example, a full-bridge type or half-bridge type inverter circuit and includes a switching device, such as a semiconductor switch, for the generation of AC power. The inverter circuit 112 converts DC power supplied from the DC power supply 111 into AC power. In addition, the inverter circuit 112 operates based on a control signal, e.g., a pulse-width modulation (PWM) signal, input from the control unit 116.

The primary side coil 114 is a power supply circuit compatible with a non-contact power supply method such as an electromagnetic induction method or a magnetic field resonance method. The primary side coil 114 includes a coil driving circuit and the like (not specifically depicted) and forms a resonance circuit together with the capacitor 113. The primary side coil 114 electromagnetically vibrates according to the AC power output from the inverter circuit 112. The current sensor 115 is provided on a path connecting the inverter circuit 112 and the capacitor 113 and detects the current value of the AC power output from the inverter circuit 112 as an output current Io.

The control unit 116 controls the operation of the inverter circuit 112 based on the output current Io detected by the current sensor 115 and an output voltage Vo (to be described later) detected by the power receiving side device 20. Details of the control unit 116 will be described below.

The power receiving side device 20 is, for example, an electronic device such as a smartphone, a tablet terminal, a notebook personal computer (PC), or a point of sale system (POS) terminal. The power receiving side device 20 includes a plurality of power receiving units 21, a DC-DC converter circuit 22, an electric load 23, a charge and discharge control circuit 24, and a secondary battery 25.

The power receiving unit 21 is connected in series to the common electric load 23. The power receiving unit 21 includes a secondary side coil 211, a capacitor 212, a rectifier circuit 213, a capacitor 214, a voltage sensor 215, and the like. Here, the capacitor 214 is connected in series between the respective power receiving units 21.

The secondary side coil 211 forms a resonance circuit together with the capacitor 212 and is electromagnetically coupled with the primary side coil 114. The rectifier circuit 213 converts the AC power (also referred as high-frequency power) generated in the secondary side coil 211 into DC power. The capacitor 214 functions to smooth the output voltage of the rectifier circuit 213. In addition, the voltage sensor 215 is provided between the terminals of the capacitor 214 and detects a voltage value between the terminals of the capacitor 214 as the output voltage Vo. The output voltage Vo detected by the voltage sensor 215 is notified to the control unit 116 of the corresponding power supply unit 11. There is no particular requirement for the notification method, but in the present embodiment, it is assumed that notification is given to the control unit 116 by communication using the coupling between the primary side coil 114 and the secondary side coil 211. In addition, in the present embodiment, the output voltage Vo detected by the voltage sensor 215 is handled as a value corresponding to the voltage value output from the inverter circuit 112.

The DC-DC converter circuit 22 is connected between the power receiving unit 21 and the electric load 23. The DC-DC converter circuit 22 converts the voltage value of the DC power supplied from each of the power receiving units 21 into a voltage value corresponding to the specification of the electric load 23. In addition, the DC-DC converter circuit 22 converts the voltage value of the DC power supplied from the secondary battery 25 into a voltage value corresponding to the specification of the electric load 23. The electric load 23 includes a load unit such as a processor and a display and operates with the DC power supplied from the DC-DC converter circuit 22.

The charge and discharge control circuit 24 is connected in parallel between the power receiving unit 21 and the DC-DC converter circuit 22 and controls charge and discharge of the secondary battery 25. For example, the charge and discharge control circuit 24 supplies the DC power output from each of the power receiving units 21 to the secondary battery 25, thereby charging the secondary battery 25. In addition, when the DC power from each of the power receiving units 21 is discontinued, the charge and discharge control circuit 24 supplies the power stored in the secondary battery 25 to the DC-DC converter circuit 22, thereby discharging the secondary battery 25.

In the non-contact power supply system 1 having the above configuration, the power supply side device 10 is used for supplying power to the power receiving side device 20. For example, the power supply side device 10 is used for supplying power to a POS terminal or the like used in a store and is provided in a state where the primary side coil 114 is embedded in a checkout counter. The POS terminal or the like which is the power receiving side device 20 is placed at a position where the primary side coil 114 on the checkout counter is embedded. In this way, it is possible to supply power from the power supply side device 10 to the power receiving side device 20 in a non-contact manner. In addition, since each of the power supply side device 10 and the power receiving side device 20 includes a plurality of power supply receiving units, it is possible to supply a large amount of power providing a large amount of current.

In the non-contact power supply system 1 having the above-described configuration, there is a possibility that an unbalance in the operation load among the power supply units 11 or among the power receiving units 21 occurs. If an unbalance in the operation load occurs, there is a possibility that elements such as semiconductor switches constituting the rectifier circuit 213 may be adversely affected, and there is a concern that the operation becomes unstable.

Accordingly, in the power supply side device 10 according to the present embodiment, in each of the power supply units 11, the control unit 116 performs control for eliminating the unbalance in the operation load. Hereinafter, the control unit 116 will be described.

Figure 2:
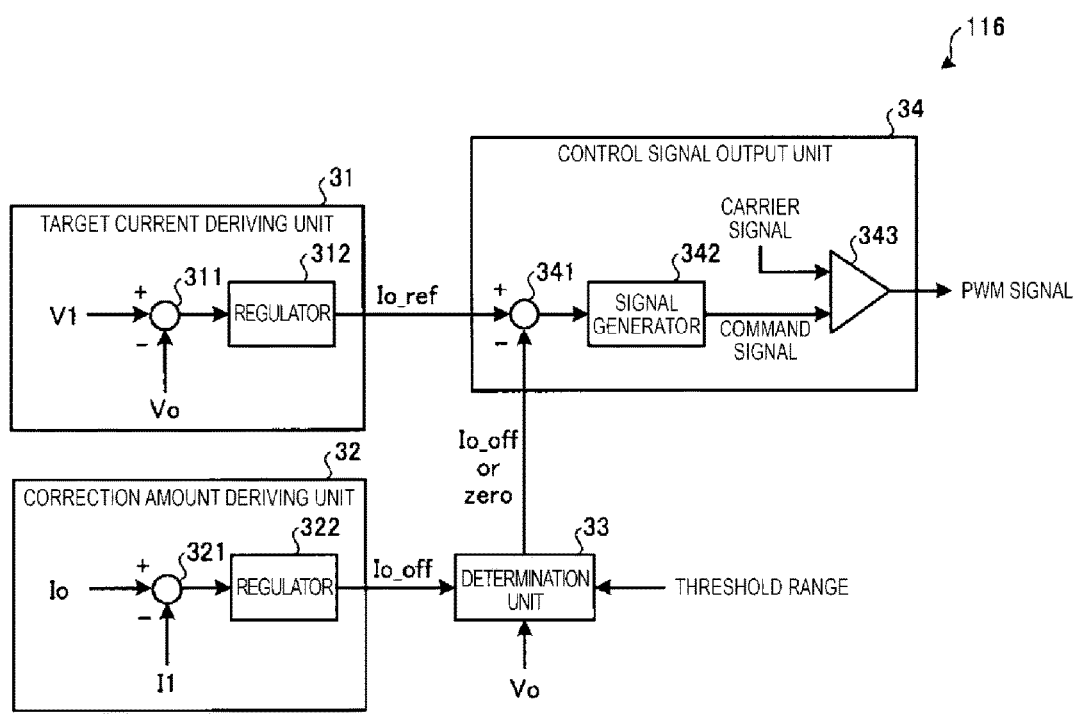
FIG. 2 is a diagram of a control unit provided in a power supply side device according to the embodiment.

FIG. 2 is a diagram of the control unit 116. As shown in FIG. 2, the control unit 116 includes a target current deriving unit 31, a correction amount deriving unit 32, a determination unit 33, and a control signal output unit 34.

Based on the difference between the output voltage Vo and a reference voltage V1, the target current deriving unit 31 derives a target current Io_ref for reducing the difference. To realize such a function, the target current deriving unit 31 includes, for example, a voltage subtractor circuit (hereinafter, simply referred to as a subtractor) 311 and a current regulator circuit (hereinafter, simply referred to as a regulator) 312.

The subtractor 311 detects a voltage difference (also referred to as a difference voltage value) between the reference voltage V1 and the output voltage Vo detected by the voltage sensor 215. Here, the reference voltage V1 is a voltage value serving as a reference determined in advance such that the power supply unit 11, or the power receiving unit 21, is controlled to output the desired voltage value. Here, it is assumed that the reference voltage V1 is a value common to all the power supply units 11.

The regulator 312 derives the target current Io_ref for reducing the voltage difference detected by the subtractor 311. Here, a method of deriving the target current Io_ref is not particularly limited, and various methods such as a proportional-integral (PI) control may be adopted. For example, the regulator 312 calculates a sum of a value proportional to the difference voltage value detected by the subtractor 311 and a value proportional to a time-integrated value of the difference voltage value to be used as the target current Io_ref. In addition, the target current Io_ref may be derived by using a data table in which each set of the difference voltage value and the target current Io_ref is associated, or by using an arithmetic expression or the like capable of deriving an appropriate target current Io_ref by inputting the difference voltage value.

The correction amount deriving unit 32 derives a correction amount for reducing a difference current value between the output current Io and a reference current I1. Here, the correction amount is a correction amount for the target current Io_ref for changing the output voltage Vo deviated from the reference voltage V1 outside of a threshold range (to be described later) to a output voltage within the threshold range. To realize such a function, the correction amount deriving unit 32 includes, for example, a current subtractor circuit (hereinafter, simply referred to a subtractor) 321 and a voltage regulator circuit (hereinafter, simply referred to as a regulator) 322.

The subtractor 321 detects the current difference (also referred to as a difference current value) between the output current Io detected by the current sensor 115 and the reference current I1. Here, the reference current I1 is a reference current value determined in advance that the power supply unit 11 is controlled to output the desired current value. It is assumed that the reference current I1 is a common value in each of the power supply units 11.

Based on the current difference detected by the subtractor 321, the regulator 322 derives a correction amount Io_off for correcting the target current Io_ref. The method of deriving the correction amount Io_off is not particularly limited. For example, the correction amount Io_off may be derived by using a data table in which each set of the current difference and the correction amount Io_off is associated, or by using an arithmetic expression or the like capable of deriving an appropriate correction amount Io_off by inputting the difference current value.

The determination unit 33 determines whether or not the output voltage Vo detected by the voltage sensor 215 is within a predetermined threshold range from the reference voltage V1. In addition, the determination unit 33 switches the value of the correction amount Io_off to be output to the control signal output unit 34 depending on whether or not the output voltage Vo falls within the threshold range.

The determination unit 33 comprises, for example, a comparator circuit, a switch, a multiplier circuit or the like, compares the output voltage Vo detected by the voltage sensor 215 with the predetermined threshold range, and determines whether or not the output voltage Vo is within the threshold range. Here, the threshold range indicates the voltage range of the output voltage Vo which the power supply unit 11 and the power receiving unit 21 may stably operate with. The reference voltage V1 is, for example, a median value of the threshold range.

The determination unit 33 multiplies the correction amount Io_off detected by the correction amount deriving unit 32 by a predetermined coefficient according to the determination result as to whether or not the output voltage Vo is within the threshold range.

In the present embodiment, when the output voltage Vo is within the threshold range, the determination unit 33 multiplies a coefficient 0 to output the correction amount Io_off=0. In addition, when the output voltage Vo exceeds an upper limit value Vmax of the threshold range or the output voltage Vo is lower than a lower limit value Vmin of the threshold range, the determination unit 33 multiplies the coefficient 1 to output the correction amount Io_off as it is. The value of the coefficient is not limited to the above example, and it is possible to set an arbitrary value.

The control signal output unit 34 corrects the target current Io_ref with the correction amount Io_off and generates a control signal (e.g., a pulse-width-modulation (PWM) signal) for controlling the inverter circuit 112 based on the corrected target current Io_ref. In addition, the control signal output unit 34 controls the operation of the inverter circuit 112 by outputting the generated PWM signal to the inverter circuit 112. In order to realize such a function, the control signal output unit 34 includes, for example, a subtractor 341, a signal generator 342, and a comparator 343.

The subtractor 341 corrects the target current Io_ref by subtracting the correction amount Io_off input from the determination unit 33 from the target current Io_ref input from the target current deriving unit 31. In addition, the subtractor 341 outputs the corrected target current Io_ref to the signal generator 342.

For example, when the output voltage Vo is within the threshold range, the correction amount Io_off becomes 0 so that the subtractor 341 outputs the target current Io_ref as it is. When the output voltage Vo exceeds the upper limit value Vmax or falls below the lower limit value Vmin, the subtractor 341 outputs a value obtained by subtracting the correction amount Io_off from the target current Io_ref as the corrected target current Io_ref.

The signal generator 342 includes a phase-locked loop (PLL) circuit or the like and generates a command signal based on the target current Io_ref input from the subtractor 341. Here, the command signal is a reference signal for generating a PWM signal to be described later and includes information for instructing to set the output current of the inverter circuit 112 to the target current Io_ref. In the present embodiment, it is assumed that the command signal is output in a form of a sinusoidal wave.

The comparator 343 generates a PWM signal for controlling the operation of the inverter circuit 112 based on the cross point between the command signal generated by the signal generator 342 and a carrier signal related to the generation of the PWM signal to output the signal to the inverter circuit 112.

Figure 3:
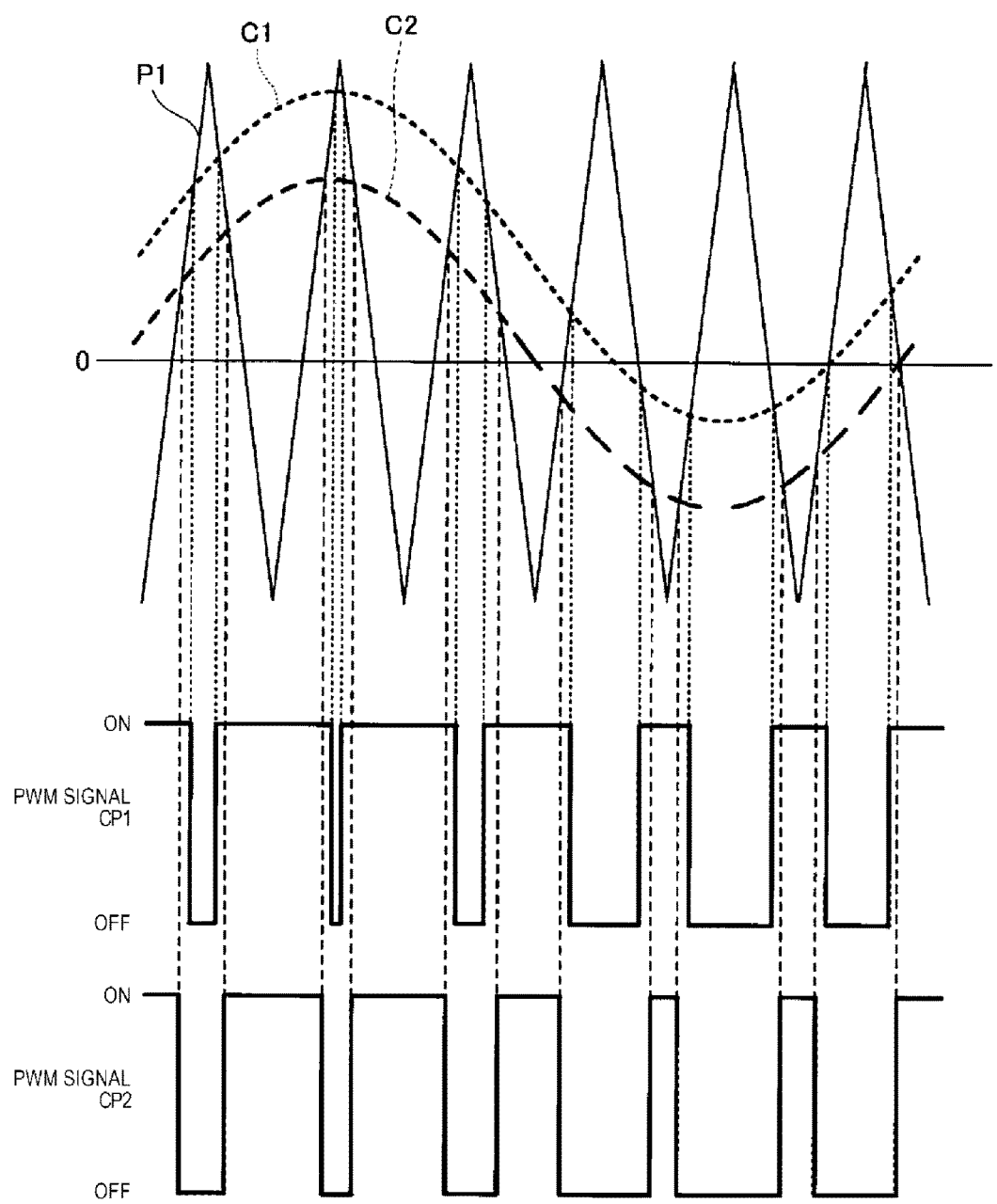
FIG. 3 is a diagram of a control signal output unit shown in FIG. 2.

FIG. 3 is a diagram of a control signal output unit 34. In FIG. 3, a command signal C1 indicates a command signal generated by the signal generator 342 when the output voltage Vo falls below the lower limit value Vmin of the threshold range. In addition, a command signal C2 indicates a command signal generated by the signal generator 342 when the output voltage Vo exceeds the upper limit value Vmax of the threshold range. As shown in FIG. 3, a command signal generated by the signal generator 342 changes the offset value of the sinusoidal wave according to the target current Io_ref. When the output voltage Vo is within the threshold range, a command signal is generated, for example, between the command signal C1 and the command signal C2.

A carrier signal P1 indicated by a triangular wave in FIG. 3 is a carrier signal to be input to the comparator 343. The carrier signal P1 is not limited to a triangular wave, but may be in another waveform.

The above command signal is input to a minus (−) terminal of the comparator 343. The carrier signal is input to a plus (+) terminal of the comparator 343. The comparator 343 compares the command signal with the carrier signal and generates a PWM signal based on the cross point of both signals. A PWM signal CP1 means a PWM signal generated based on the command signal C1 and the carrier signal P1. In addition, a PWM signal CP2 means a PWM signal generated based on the command signal C2 and the carrier signal P1.

These PWM signals are represented by binary signals and instruct on and off of a switching device constituting the inverter circuit 112. According to the PWM signal input from the comparator 343, the inverter circuit 112 turns on and off the switching device constituting the own inverter circuit 112 thereof. In the PWM signal, an on and off duty ratio changes according to the command signal of the generation source. As a result, the AC power output from the inverter circuit 112 changes, and a desired current value (target current Io_ref) is output. It is possible to equalize the output voltage Vo detected by each of the power receiving units 21, that is, the output voltage output by each of the power supply units 11 (inverter circuit 112), and it is possible to eliminate the unbalance of the operation load.

Figure 4:
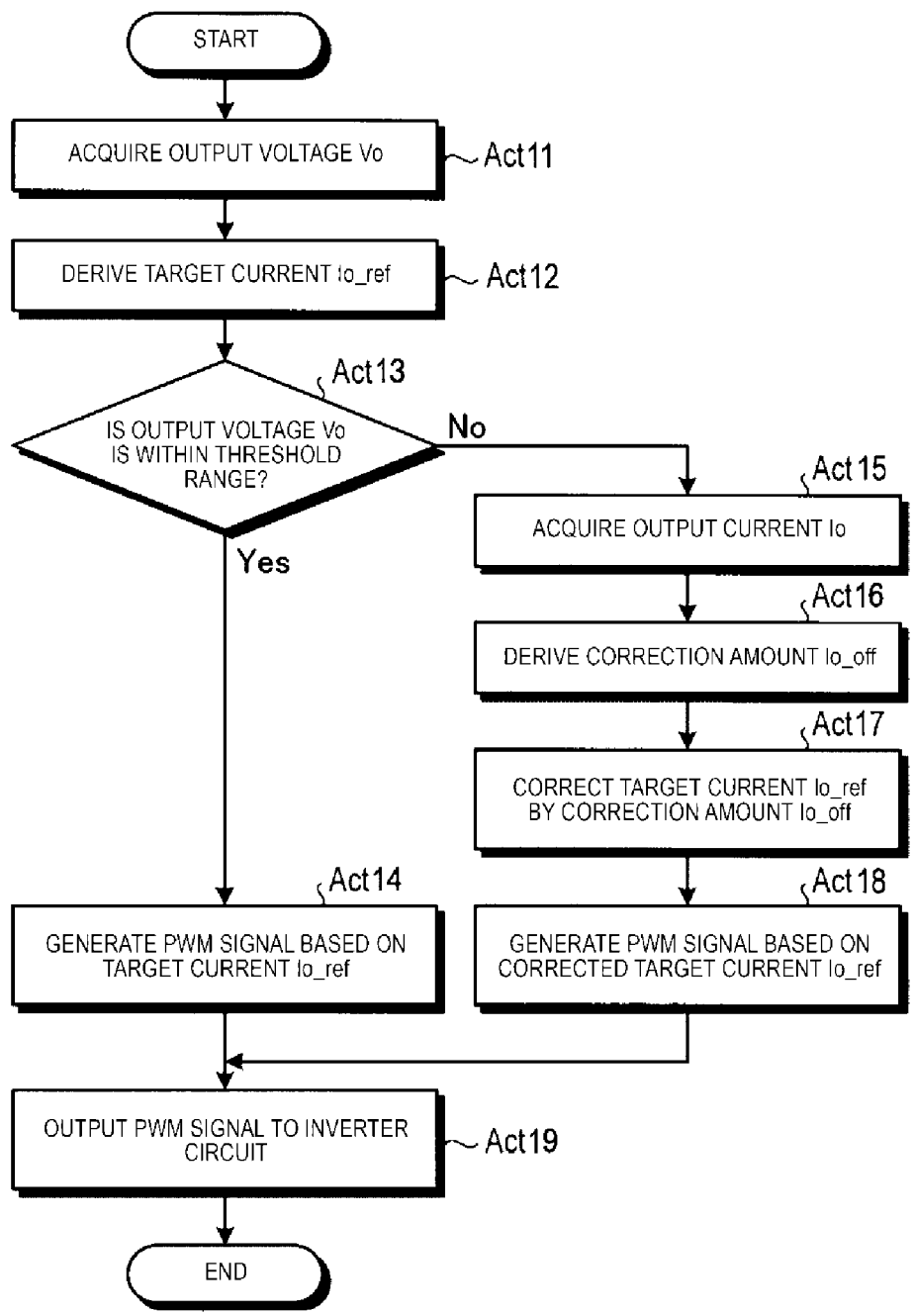
FIG. 4 is a flowchart of processing executed by a control unit of a power supply side device.

FIG. 4 is a flowchart of processing executed by the control unit 116 of the power supply side device 10.

First, the target current deriving unit 31 acquires the output voltage Vo detected by the voltage sensor 215 (Act 11). Subsequently, the target current deriving unit 31 derives the target current Io_ref based on the difference between the acquired output voltage Vo and the reference voltage V1 (Act 12).

Subsequently, the determination unit 33 determines whether or not the output voltage Vo is within the threshold range (Act 13). Here, when the output voltage Vo is within the threshold range (Act 13: Yes), the control signal output unit 34 generates a PWM signal based on the target current Io_ref derived in Act 12 (Act 14), and the processing proceeds to Act 19.

When the output voltage Vo is outside the threshold range (Act 13: No), the correction amount deriving unit 32 acquires the output current Io detected by the current sensor 115 (Act 15). Then, the correction amount deriving unit 32 derives the correction amount Io_off based on the difference between the acquired output current Io and the reference current I1 (Act 16).

The control signal output unit 34 corrects the target current Io_ref derived in Act 12 with the correction amount Io_off (Act 17). The control signal output unit 34 generates a PWM signal based on the corrected target current Io_ref (Act 18), and the processing proceeds to Act 19.

The control signal output unit 34 outputs the PWM signal generated in Act 14 or Act 18 to the inverter circuit 112 (Act 19), and the present processing is ended.

As described above, in the power supply side device 10 according to the present embodiment, each of the power supply units 11 performs control for reducing the difference value based on the difference value between the output voltage Vo and the reference voltage V1 on the inverter circuit 112. When the output voltage Vo deviates from the threshold range, each of the power supply units 11 performs control for reducing the difference value on the inverter circuit 112 based on the difference value between the output current Io and the reference current I1.

In this way, even when the output voltage Vo deviates from the reference voltage V1 or when the output voltage Vo deviates from the threshold range including the reference voltage V1, it is possible to return the output voltage Vo within the reference voltage V1 or the threshold range. Therefore, since the unbalance of the operation load may be eliminated, power may be stably supplied from the power supply side device 10 to the power receiving side device 20. In addition, since the control of the inverter circuit 112 may be switched depending on whether or not the output voltage Vo is within the threshold range, it is possible to efficiently return the output voltage outside the threshold range, thereby stabilizing the power supply with a relatively simple configuration.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, in the example embodiments described above, the output voltage of the inverter circuit 112 is detected on the side of the power receiving side device 20, but the detection of the output is not limited thereto. The output voltage may be detected on the side of the power supply side device 10. In this case, the voltage between the capacitors 113 may be detected by a voltage sensor similar to the voltage sensor 215, for example.

A part or all of the functional units of the control unit 116 described above may be implemented by software executed on a processor such as a central processing unit (CPU) and stored in a storage medium such as a ROM. A part or all of the functional units of the control unit 116 may be implemented by the above-described circuits or hardware such as an integrated circuit (IC). A part or all of the functional units of the control unit 116 may be implemented by using software and hardware in combination.

When a part or all of the functional units of the control unit 116 are implemented by software, a program executed by the processor may be recorded and provided on a non-volatile computer readable recording medium such as a CD-ROM, a flexible disk (FD), a CD-R, a digital versatile disk (DVD), and the like in a file in an installable format or executable format. The program executed by the processor may be stored on a computer connected to a network such as the Internet and provided by being downloaded via the network.

What is claimed is:

1. A non-contact power supply device, comprising:
   an inverter circuit configured to convert power supplied from a direct current (DC) power supply into alternating current (AC) power;
   a resonant circuit configured to supply the AC power to an external power receiving device in a non-contact manner;
   a current sensor electrically connected the inverter circuit;
   a voltage subtractor circuit configured to detect a voltage difference between a predetermined reference voltage and a voltage value of the AC power as detected by a voltage sensor in the external power receiving device;
   a current subtractor circuit configured to detect a current difference between a predetermined reference current and a current value of the AC power as detected by the current sensor; and
   a controller configured to control the inverter circuit to reduce the voltage difference and the current difference when the voltage is outside a predetermined range.

2. The non-contact power supply device according to claim 1, further comprising:
   a current regulator configured to set a target current value to reduce the voltage difference, wherein
   the controller is further configured to control the inverter circuit to output the AC power with the target current value.

3. The non-contact power supply device according to claim 2, further comprising:
   a voltage regulator configured to set a correction amount for adjusting the target current value such that the inverter circuit will output AC power having a voltage within the predetermined range.

4. The non-contact power supply device according to claim 1, wherein the voltage subtractor circuit acquires the voltage value of the AC power from the voltage sensor by wireless communication.

5. The non-contact power supply device according to claim 1, wherein the resonant circuit comprises a capacitor and a coil.

6. A non-contact power supply system, comprising:
a plurality of non-contact power supply devices according to claim 1, each non-contact power supply device configured to supply power to a corresponding power receiving unit in a plurality of power receiving units in the external power receiving device.

7. The non-contact power supply system according to claim 6, wherein inverter circuits in each of the plurality of non-contact power supply devices are connected in common to the DC power supply.

8. The non-contact power supply system according to claim 6, wherein inverter circuits in each of the plurality of non-contact power supply devices are connected to a different DC power supply.

9. The non-contact power supply system according to claim 6, wherein each of the plurality of non-contact power supply devices use the same reference voltage and the same reference current.

10. A non-contact power supply method, comprising:
converting direct current (DC) power supplied from a power supply into alternating current (AC) power using an inverter circuit;
supplying the AC power to an external power receiving device in a non-contact manner;
detecting a voltage difference between a predetermined reference voltage and a voltage value of the AC power detected by a voltage sensor in the external power receiving device;
detecting a current difference between a predetermined reference current and a current value of the AC power as detected by a current sensor; and
controlling the inverter circuit to reduce the voltage difference and the current difference when the voltage is outside a predetermined range.

11. The non-contact power supply method according to claim 10, further comprising:
setting a target current value to reduce the voltage difference; and
controlling the inverter circuit to output the AC power with the target current value.

12. The non-contact power supply method according to claim 11, further comprising:
setting a correction amount for adjusting the target current value such that the inverter circuit will output AC power having a voltage within the predetermined range.

13. The non-contact power supply method according to claim 10, further comprising:
acquiring the voltage value of the AC power from the voltage sensor by wireless communication.

14. A non-contact power supply device, comprising:
an inverter circuit configured to convert power supplied from a direct current (DC) power supply into alternating current (AC) power;
a resonant circuit configured to supply the AC power to an external power receiving device in a non-contact manner;
a current sensor electrically connected the inverter circuit;
a voltage subtractor circuit configured to detect a voltage difference between a predetermined reference voltage and a voltage value of the AC power as detected by a voltage sensor in the external power receiving device;
a current subtractor circuit configured to detect a current difference between a predetermined reference current and a current value of the AC power as detected by the current sensor; and
a controller configured to control the inverter circuit to reduce the voltage difference and the current difference when the voltage is outside a predetermined range, wherein
the resonant circuit comprises a capacitor and a coil.

15. The non-contact power supply device according to claim 14, further comprising:
a current regulator configured to set a target current value to reduce the voltage difference, wherein
the controller is further configured to control the inverter circuit to output the AC power with the target current value.

16. The non-contact power supply device according to claim 15, further comprising:
a voltage regulator configured to set a correction amount for adjusting the target current value such that the inverter circuit will output AC power having a voltage within the predetermined range.

17. The non-contact power supply device according to claim 14, wherein the voltage subtractor circuit acquires the voltage value of the AC power from the voltage sensor by wireless communication.

18. A non-contact power supply system, comprising:
a plurality of non-contact power supply devices according to claim 14, each non-contact power supply device configured to supply power to a corresponding power receiving unit in a plurality of power receiving units in the external power receiving device.

19. The non-contact power supply system according to claim 18, wherein inverter circuits in each of the plurality of non-contact power supply devices are connected in common to the DC power supply.

20. The non-contact power supply system according to claim 18, wherein inverter circuits in each of the plurality of non-contact power supply devices are connected to a different DC power supply.

* * * * *